Patented June 17, 1947

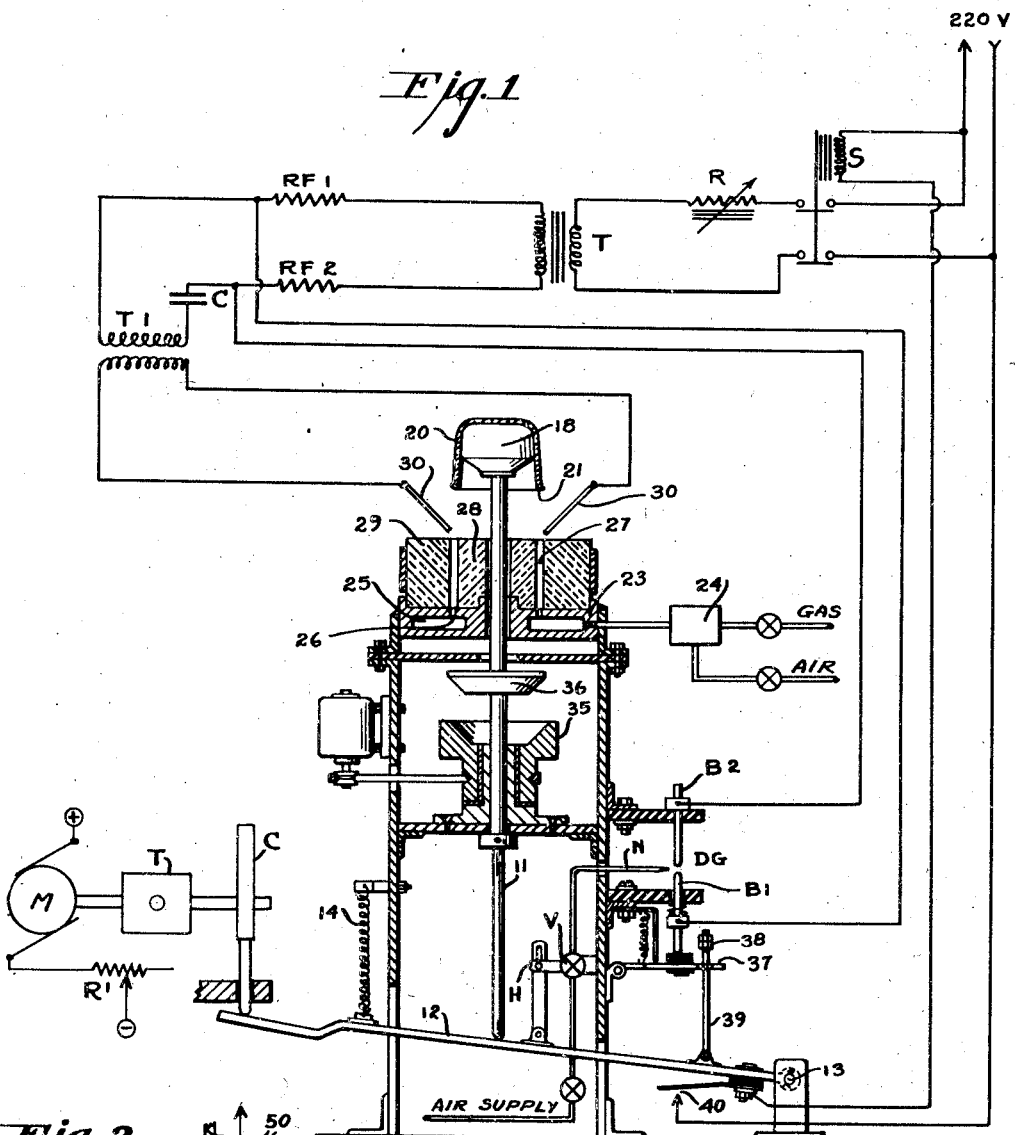
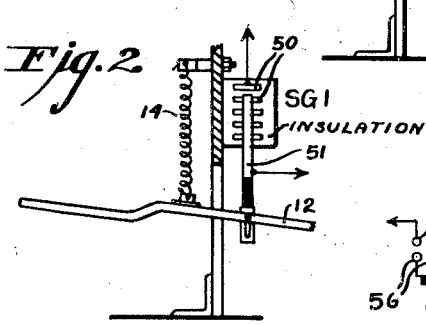
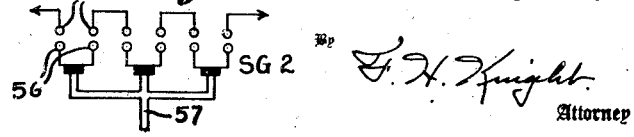

2,422,482

UNITED STATES PATENT OFFICE 2,422,482

APPARATUS FOR FIRE-POLISHING GLASS ARTICLES

Edwin M. Guyer, Corning, N. Y., assignor to Corning Glass Works, Corning, N. Y., a corporation of New York Application September 4, 1943, Serial No. 501,299

12 Claims. (Cl. 219—19)

The present invention relates to fire polishing of glassware to improve the surface finish thereof. It is common practice to fire polish portions of a glass article by subjecting the article surfaces to combustion flames of sufficient heat intensity to melt and fire finish the surfaces. This method is quite satisfactory for articles composed of glasses which melt at low or moderate temperatures especially if the walls of the articles are thin or of medium thickness. However, for fire polishing heavy-walled ware, or even thin-walled ware, conventional fire polishing methods are not satisfactory when the ware is composed of glass which has a relatively high melting point, such methods being too slow for volume production of ware and also quite wasteful of fuel.

The prime object of the present invention is an improved method of and apparatus for fire polishing glass articles.

A further object is an economical and relatively fast way of fire polishing glass articles even though such articles may be of large mass and/or composed of glass compositions having high temperature softening points as compared with ordinary lime glasses.

The foregoing and other objects are attained by preheating the surface area of an article to be thermally polished by a non-electrically conductive gas-air combustion product flame to an electrically conducting temperature and passing a current of electricity through the preheated area of the article to further increase the temperature of such preheated area as required to carry out the polishing operation. To maintain an even rate of temperature increase throughout the article area being heated, rotation of the article while electrical heating is in progress is resorted to when the shape characteristic of the surface area of the article permits. Centrifugal forces developed during rotation of the article are also taken advantage of to effect slight reshaping of the surface area of the article being polished.

The entire operation may be performed by equipment placed under control of a single manually or automatically operated device. Such equipment may comprise a support adapted to move, under control of the device, to a position in which means are rendered effective to rotate the support and in which position that portion of an article to be thermally treated becomes associated with a preheat unit and with electrodes positioned to feed heating current into the portion of the article associated with the preheat unit. Connection of a power source with such electrodes may also be effected by said device, and arranged to take place after preheating has occurred.

Because of the nature of a pyroelectrolyte such as glass it is impracticable to direct the high power current source into the glass as required to soften it until its temperature, and hence its conductivity, has reached a higher value than readily attainable from a preheat unit. If a high power source is connected to the electrodes before the conductivity of the preheated portion of glass between the electrodes has reached a lower resistance to current flow than that of a path between the electrodes over the surface of the article, flash-over will occur without useful heating up of the glass. On the other hand, if a low power source is connected to the electrode the glass temperature rise will be slow and insufficient to soften the glass.

The problem of raising the temperature of the glass to that necessary for polishing and/or shaping has been solved by provision of a source of electric energy whose power is determined by the instantaneous characteristics of a spark gap whose breakdown characteristics can be readily modified by the article support control device to gradually raise the level of power output as the conductivity of the glass becomes greater. In case the spark gap employed is of a type requiring quenching, such action may also be placed under the control of the article support control device.

One embodiment of the invention is semi-diagrammatically illustrated in Fig. 1 of the accompanying drawing;

Fig. 2 of the accompanying drawing illustrates an alternative form of spark gap structure which may be employed in lieu of that illustrated in Fig. 1; and Fig. 3 illustrates a third form of gap which may be employed in lieu of those shown in Figs. 1 and 2.

Referring to Fig. 1 of the drawing in detail, there is provided a suitably mounted vertically disposed rotatable shaft 11 movable endwise a limited distance. Shaft 11 rests on a lever 12 pivoted about a horizontal axis 13. The free end of lever 12 is resiliently held in a raised position by a spring 14, so that the lever serves also to maintain shaft 11 normally in its upward position. Shaft 11 at its upper end carries a refractory article support 18 adapted to receive an inverted article 20 whose peripheral edge 21 is to be fire polished.

Arranged below support 18 and surrounding shaft 11 is a surface combustion burner comprising annular refractory units 28 and 29 arranged on a plate 23 in such relation as to form a combustion chamber 27 between the exterior wall of unit 28 and the interior wall of unit 29 immediately over an annular passage 25 in plate 23. Passage 25 is supplied with a suitable mixture of air and gas from a mixing chamber 24 and feeds the mixture to passage 25 which in turn feeds the mixture to chamber 27 via a series of perforations 26.

As will be observed, the combustion chamber 27 is of substantially the same diameter as the article edge 21 and it is merely necessary to reduce the space between edge 21 and chamber 27 to efficiently transmit heat to the article edge. In the present disclosure this is accomplished by depressing lever 12 the desired distance, permitting shaft 11 to be lowered by gravity. As will be appreciated, if the article 20 is heavy-walled ware and/or composed of a glass composition having a high melting point, an excessively long time will be required to fire polish it by heat from the burner alone. The heating up of the edge 21 is accordingly greatly accelerated by passing an electric current through the edge 21 of the article. The electric current is supplied by a pair of electrodes 30 arranged adjacent opposite sides of the article edge 21 when the article is in position to be heated by the burner. Rotation is effected by a cone clutch comprising a driving element 35 rotating about shaft 11 and a driven element 36 integral with shaft 11 and adapted to engage and halt the downward movement of shaft 11 when the desired spacing between article 20 and the burner has been attained.

The lever 12 may, if desired, be manually operated, as by the foot of an operator, or mechanically lowered at the desired rate by a cam such as C rotated by a motor M at a speed which can be suitably regulated by means of a rheostat R' in the circuit of motor M and/or by a variable speed transmission T in the cam drive.

*Electric heating current supply control*

The application of suitable electrical potentials to electrodes 30 and the power level thereof is also under control of lever 12 which, after being lowered sufficiently to bring the article into heat transfer relation with the burner, is lowered still further to close a pair of contacts 40 to energize a power control solenoid S from the 220 volt commercial current supply line leads indicated. The solenoid S connects the commercial frequency current supply to the primary of an iron core transformer T whose high tension secondary winding is included in a tank circuit including radio frequency choke RF1, the primary winding of an air core transformer T1, condenser C and a radio frequency choke RF2. The tank circuit also includes an adjustable spark discharge gap DG one terminal of which, comprising a movable bar B1, is connected to the traced circuit at a point intermediate the choke coil RF1 and the primary winding of transformer T1 and the other terminal of which, comprising a stationary bar B2, is connected at a point intermediate condenser C and the choke coil RF2. The secondary terminals of transformer T1 are connected with the heating electrodes 30.

In the foregoing circuit the inductance, capacity and gap form a resonant circuit. The power input to this circuit is varied by simply changing the width of the gap which determines the discharge voltage of condenser C and accordingly the intensity of power delivered to electrodes 30. As will be recalled, the gap DG is between stationary bar B2 and movable bar B1. Bar B1 is normally resiliently held in its closed spaced relation to bar B2 by a spring raised lever 37 adapted to be lowered by a nut 38 threaded to one end of a rod 39 whose other end is pivoted to lever 12. The position of nut 38 on rod 39 is adjusted to permit the lowering of lever 12 as required to bring the shaft 11 to its lowermost position without lowering of bar B1. To insure a high number of spark discharges across gap DG, per unit of time, a nozzle N is provided to direct a blast of air into the space between bars B1 and B2 which removes ionized air and quickly terminates each discharge. The air is supplied through nozzle N via a spring closed valve V whose handle H is arranged to be operated by lever 12 before the lever is lowered sufficiently to lower bar B1. Also before lowering of bar B1 occurs lever 12 closes the contacts 40 in the energizing circuit of power control solenoid S. The power input is further controlled by the variable reactance R in the circuit of the primary winding of transformer T.

*Operation*

Briefly the polishing operation is performed as follows. Assuming the burner unit to be in operation and that driving element 35 is rotating, article 20 is arranged on support 18 in the position illustrated and lever 12 is lowered until rotation of shaft 11 begins. Lever 12 is held in this position for a brief period of time to definitely raise the temperature of the article edge 21 over that of the remainder of the article, which may initially be at room temperature, or at a higher uniform temperature, as it comes from a press. After such time lapse as is required to preheat the portion of the article to be polished to a temperature at which such portion is sufficiently conductive to utilize advantageously power applied with the initial spacing of gap GB, the lever 12 is lowered further to open valve V and to apply power by closing contacts 40 to effect the actuation of solenoid S just before the nut 38 engages lever 37 to lower bar B1. As the temperature and hence the conductivity of the article increases lever 12 is depressed further causing nut 38 to depress lever 37 and thus permit bar B1 to gradually open the gap wider and wider and thus increase the power at the rate which the increased conductivity of the glass permits. When, as judged by observation of an operator, assuming manual operation of lever 12, proper heating of the article rim 21 has taken place to give the desired finish, lever 12 is released and restores to its initial position under the influence of spring 14. It will be appreciated, therefore, that the instant structure provides means for initially applying the maximum of power that the conductivity of the glass will permit and for increasing the power applied as the conductivity of the glass increases making possible heating of the glass at the optimum rate.

Although in the form of the invention illustrated in Fig. 1 a single discharge gap is employed whose characteristics are modified by varying the size of the gap, the invention is by no means limited to this form of structure. If preferred a series spark gap of the form shown in Fig. 2 or Fig. 3 may be used. The gap SG1 (Fig. 2) comprises a series of suitably supported gap elements 50 all of which except the top two are normally shunted by a slide 51 linked to lever 12. As the lever 12 is lowered beyond the extent necessary to bring an article 20 to its lowermost position the remaining gap elements 50 are successively made active to raise the power output level of the circuit.

Gap SG2 (Fig. 3) comprises a series of fixed elements 55 employed instead of element B2 (Fig. 1) and a group of elements 56 fixed with respect to one another and movable in unison by a member 57 which may be actuated in the same manner as is element B1 of Fig. 1 to raise the power output level.

Although in the foregoing there has been described the preferred embodiments of the invention, it is to be understood that minor changes in the details of construction and combination of parts may be made without departing from the spirit and scope of the invention as claimed.

What is claimed is:

1. In an apparatus for thermally polishing a circular surface of a glass article, a vertically disposed shaft, a lever for holding said shaft raised from a normal position of rest, resilient means for holding said lever in a raised position, said shaft being permitted to move by gravity to its normal position when said lever is lowered, a support at the top of said shaft for an article having a circular surface to be polished, a heating unit adapted to direct heat into the circular surface of the glass article while said shaft is in its normal position, a pair of electrodes associated with said heating unit positioned to pass heating current through an arcuately localized section of the circular surface of the article, means operated by said lever, after it has been lowered sufficiently to permit said shaft to attain its normal position, to supply heating potential to said electrodes, and means for rotating said shaft while in its normal position so that all sections of the circular surface of the article are influenced in like manner by heating current supplied through said electrodes.

2. In an apparatus suitable for thermally polishing the peripheral edge of a circular glass article, a vertically disposed endwise movable and rotatable shaft, a support attached to said shaft for holding an article to be polished, a heating unit so associated with said support as to direct heat into the edges of an article thereon when said shaft is lowered, means including a lever for normally keeping said shaft raised, a pair of spaced electrodes having potential delivery ends spaced from one another along the peripheral edge of the article when said shaft is lowered, and means activated to rotate said shaft and to apply heating potential to said electrodes when the lever is lowered whereby the entire length of the edge surface of the article is progressively heated by current from said electrodes fed through a constantly changing section of the edge surface while the entire peripheral edge of the article is in heat transfer relation to said heating unit.

3. A thermal polishing apparatus embodying an article support, an article heating apparatus normally disassociated from said support, a pair of electrodes associated with said heating apparatus arranged to feed heating current through one section of that portion of an article associated with said first heating apparatus, a normally inactive circuit through which heating current is supplied to said electrodes, a variable spark gap embodied in said circuit, an air supply line having a nozzle directed toward said gap and attached to an air line containing a valve, a device under whose control said support is moved to associate an article with said heating apparatus, and means under the influence of said device to make said circuit active, to actuate said valve to supply spark quenching air through said gap, to modify the spacing of the gap in accordance with the power desired to be applied to said electrodes, and to bring about relative movement between the article and said electrodes to effect an even distribution of heating current through all sections of that portion of the article associated with said first heating apparatus.

4. In an apparatus for thermally polishing a peripheral portion of a glass article, a heating unit adapted to direct heat into the portion to be polished, means for so supporting the article that the peripheral portion to be polished is in efficient heat transfer relation to said heating unit, electrodes arranged at spaced points along the peripheral portion of the article associated with said heating unit, a device for applying electrical potential to said electrodes to further heat the peripheral section of the portion therebetween, means for effecting relative rotary movement of the article and electrodes whereby all of the peripheral portions of the article are supplied with heating current by said electrodes, and means under the influence of said device for increasing the level of the power being delivered to said electrodes beyond any increase of power flow resulting from increase in conductivity of the glass alone.

5. In an apparatus for thermally polishing the circular edge of a glass article, a support element for holding the article to be polished; a heating element, spaced from said support element, adapted to direct heat toward the circular edge of the article; means for bringing one of said elements into close association with the other whereby a substantial amount of heat from the heating element is imparted to the edge of the article, a pair of spaced electrodes arranged adjacent to but spaced from the edge of the article when associated with said heating element, a device for establishing a potential difference between the electrodes of said pair to introduce a current of electricity into the heated edge of the article at one point and to withdraw it from another, and means under the influence of said device for increasing the level of the power being delivered to said electrodes beyond any increase of power flow resulting from increase in conductivity of the glass alone.

6. In a glass working apparatus a vertically disposed shaft, a heating unit having a circular top heat delivery area concentric to the axis of said shaft, an element arranged on said shaft intermediate its ends adapted to have rotary motion imparted thereto to rotate said shaft, a glassware support arranged on said shaft at a position above that of said heating unit, a rotating element arranged below said first element, means for enabling an endwise movement of said shaft downward to bring said elements into driving relation and the peripheral edge of an article of glassware arranged on said support into efficient heat transfer relation with said heating unit, and means actuated following the downward movement of said shaft for introducing a current of electricity into the edge of the body at one point passed by it as it rotates and for withdrawing it therefrom at another point passed by it as it rotates whereby said last means assists in the heating of the entire peripheral edge of the article to a desired temperature.

7. A glass article support, thermal polishing means associated with said support including a pair of electrodes normally disassociated from an article on said support to be polished, a lever under whose control the mutual relationship of the support and electrodes is modified as required for delivery of power from the electrodes into the article, a power circuit for the electrodes having a pair of normally open contacts therein, two discharge gap elements in said circuit one of which is movable relative to the other, a valved air supply line having an outlet directed toward the space between said gap elements, and mechanical actuating linkages between said lever and the movable discharge gap elements, between said lever and the valve in said line, and between said lever and said contacts.

8. In a glass article thermal polishing apparatus, means for supporting an article, article preheating means, a normally inactive auxiliary means for passing an electric current through a section of a preheated portion of the article, apparatus normally so holding said support that an article thereon is out of heating relation with said preheating means, a device for moving said apparatus from under said support whereby said support moves by gravity as required to bring an article into close proximity to said heating means, means actuated by said apparatus by its further operation by said device to actuate said auxiliary means, and means for rotating said article support to progressively and repeatedly pass heating current from the auxiliary means through all sections of the preheated portion of the article.

9. In a thermal polishing apparatus for glassware, a pair of electrodes, an article support, mechanical means for effecting a relative movement between the electrodes and said support to establish potential delivery relationship of said electrodes with a glass article, a circuit for supplying an electrical potential to said electrodes, contacts in said circuit closed by said mechanical means, an air gap for said circuit modified by said mechanical means, and a valve opened by said mechanical means to supply air to said gap to modify its influence on said circuit.

10. An electric power applying apparatus including a power circuit having incorporated therein a pair of discharge gap elements normally arranged in predetermined minimum spaced relation, means operable to bring a glass article into position to be heated by the Joule effect with power supplied by said circuit and said means being also operable to increase the space between said elements as the conductivity of the article increases, a compressed air line having an outlet directed toward said space, a valve in said line opened by said means as an article is brought into position to be operated upon, and a pair of normally open contacts in said circuit also closed by said means.

11. In a thermal polishing apparatus, an article support, a unit for heating a predetermined portion of an article arranged on said support, electrodes associated with said unit for passing heating current through portions of an article while being heated by said unit, a circuit for supplying high frequency heating potentials to said electrodes, variable controlled spark discharge means associated with said circuit under whose control the power is applied to said electrodes and means for varying the discharge characteristics of said discharge means in accordance with desired changes in power input requirements resulting from changes in conductivity of the articles.

12. In an electric glass working device, a pair of spaced electrodes arranged in operative position adjacent a glass article, an electric power circuit connected to said electrodes, a control device movable to energize said power circuit, means in said power circuit for varying the electrical characteristics thereof including an adjustable spark gap and means under the control of said control device for increasing the breakdown voltage of said gap after said power circuit has been energized.

EDWIN M. GUYER.

REFERENCES CITED

The following references are of record in the file of this patent:

UNITED STATES PATENTS

| Number | Name | Date |
| --- | --- | --- |
| 2,306,054 | Guyer | Dec. 22, 1942 |
| 916,959 | Cummins | Mar. 30, 1909 |
| 422,910 | Brown | Mar. 11, 1890 |
| 558,109 | Reichel | Apr. 14, 1896 |
| 2,020,000 | Schellenger | Nov. 5, 1935 |